(12) United States Patent  
Morinaga (10) Patent No.: US 8,751,286 B2  
(45) Date of Patent: Jun. 10, 2014

(54) LOSS DISTRIBUTION CALCULATION SYSTEM, LOSS DISTRIBUTION CALCULATION METHOD AND LOSS DISTRIBUTION CALCULATION-USE PROGRAM

(75) Inventor: Satoshi Morinaga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/497,556

(22) PCT Filed: Sep. 24, 2010

(86) PCT No.: PCT/JP2010/066514  
§ 371 (c)(1),  
(2), (4) Date: Mar. 22, 2012

(87) PCT Pub. No.: WO2011/037169  
PCT Pub. Date: Mar. 31, 2011

(65) Prior Publication Data  
US 2012/0278126 A1 Nov. 1, 2012

(30) Foreign Application Priority Data

Sep. 25, 2009 (JP) ................................. 2009-220731

(51) Int. Cl.  
*G06Q 10/00* (2012.01)  
*G06Q 40/00* (2012.01)

(52) U.S. Cl.  
USPC ........................................................ 705/7.28

(58) Field of Classification Search  
USPC .............................................. 705/7.11–7.42  
See application file for complete search history.

(56) References Cited

U.S. PATENT DOCUMENTS 7,409,357 B2 * 8/2008 Schaf et al. ................... 705/7.28  
7,698,213 B2 * 4/2010 Lancaster ....................... 705/38

(Continued)

FOREIGN PATENT DOCUMENTS

JP 2001-338124 A 12/2001  
JP 2003-36343 A 2/2003

(Continued)

OTHER PUBLICATIONS

Frachot et al. "Loss Distribution Approach in Practice" (2003) (http://www.maths-fi.com/malliavin/Loss_Distribution_Approach_in_Practice_05_02_2003.pdf).*

(Continued)

*Primary Examiner* — Sujay Koneru  
(74) *Attorney, Agent, or Firm* — Sughrue Mion, PLLC (57) ABSTRACT

A loss distribution calculation system including: a section that performs at least one of upside and downside discretizations for a scale distribution; a section that calculates, after dividing all events, a probability value of a cumulative sum of losses for a portion out of all events in order to calculate at least one of upside and downside sub-composite distributions, the upside sub-composite distribution being calculated based on the frequency distribution and the upside-discretized scale distribution, and the downside sub-composite distribution being calculated based on the frequency distribution and the downside-discretized scale distribution; a section that calculates upper and lower bounds of a loss distribution function based on at least one of the upside and downside sub-composite distributions, calculates a function, as an approximate value of the loss distribution function, based on at least one of the upside and downside sub-composite distributions, and calculates an accuracy of the approximate value.

8 Claims, 6 Drawing Sheets

(56) References Cited

U.S. PATENT DOCUMENTS

| | | | |
|---|---|---|---|
| 8,290,793 B2* | 10/2012 | Aebischer | 705/4 |
| 2002/0116236 A1* | 8/2002 | Johnson et al. | 705/7 |
| 2003/0088510 A1 | 5/2003 | Yokota et al. | |
| 2003/0139993 A1* | 7/2003 | Feuerverger | 705/36 |
| 2003/0149657 A1* | 8/2003 | Reynolds et al. | 705/38 |
| 2005/0065754 A1* | 3/2005 | Schaf et al. | 702/188 |
| 2006/0116945 A1 | 6/2006 | Nishikawa | |
| 2009/0012840 A1* | 1/2009 | Gaubatz et al. | 705/10 |
| 2009/0138309 A1* | 5/2009 | Reynolds et al. | 705/7 |
| 2010/0114757 A1* | 5/2010 | Jeng et al. | 705/38 |

FOREIGN PATENT DOCUMENTS

| | | |
|---|---|---|
| JP | 2003-141349 A | 5/2003 |
| JP | 2004-252893 A | 9/2004 |
| JP | 2004-272674 A | 9/2004 |
| JP | 2006-155427 A | 6/2006 |
| JP | 2006-178891 A | 7/2006 |
| JP | 2008-159012 A | 7/2008 |
| JP | 2009-032237 A | 2/2009 |

OTHER PUBLICATIONS

Frachot et al. "Loss Distribution Approach for operational risk" (2001) (http://www.thierry-roncalli.com/download/lda.pdf).*

Kobayashi, Shimizu, Nishiguchi, Morinaga., "Challenge to Sophisticated Operational Risk Management," Kinzai Institute for Financial Affairs, Chapter 3 Operational Risk Quantification Framework and Verification Thereof, pp. 108-144.

The Center for Financial Industry Information Systems Kenkyukai Jimukyoku, 'Togoteki Risk Kanri Benkyokai (Part 3)' Hokokusho—Operational Risk no Keiroyka ni Tsuite—, Kin'yu Joho System; Mar. 1, 2001, pp. 116-133, No. 241.

International Search Report of PCT/JP2010/066514 dated Oct. 26, 2010.

* cited by examiner

LOSS DISTRIBUTION CALCULATION SYSTEM, LOSS DISTRIBUTION CALCULATION METHOD AND LOSS DISTRIBUTION CALCULATION-USE PROGRAM

CROSS REFERENCE TO RELATED APPLICATIONS

This application is a National Stage of International Application No. PCT/JP2010/066514 filed Sep. 24, 2010, claiming priority based on Japanese Patent Application No. 2009-220731 filed Sep. 25, 2009, the contents of all of which are incorporated herein by reference in their entirety.

TECHNICAL FIELD

The present invention relates to a loss distribution calculation system, loss distribution calculation method and loss distribution calculation program, and particularly to a loss distribution calculation system, loss distribution calculation method and loss distribution calculation program that are able to guarantee the accuracy of a loss distribution calculated.

BACKGROUND ART

In the field of damage insurance or operational risk management, the total sum of losses to be suffered during a specific period of time in the future is regarded as a probability variable, and a probability distribution function thereof needs to be calculated. Hereinafter, the "specific period of time in the future" is referred to as a holding period, "the total sum of losses to be suffered during the holding period" as a cumulative sum of losses, and the "probability distribution function that the cumulative sum of losses follows" as a loss distribution.

What is disclosed in NPL 1 is an example of a loss distribution calculation system of a related technology for calculating such a loss distribution. As disclosed in NPL 1, the loss distribution calculation system typically performs a Monte Carlo simulation in which: a probability distribution about the number of loss events in the holding period (referred to as a frequency distribution, hereinafter), and a probability distribution about the scale of losses in each loss event (referred to as a scale distribution, hereinafter) are input into the loss distribution calculation system; random numbers N that follow the frequency distribution are generated, while N random numbers that follow the scale distribution are generated; a process of calculating the sum thereof as a cumulative sum of losses is performed many times as calculator experiments; and an empirical distribution of the resultant cumulative sum of losses is recognized as a calculation result of the loss distribution. Other publicly known methods include a method of analytically calculating a loss distribution by making a convolution operation more efficient.

In that regard, what is disclosed in PTL 1 is an operational risk quantification device including: a means for reading a transaction amount; a means for reading a loss rate density; a huge loss density calculation means for calculating a huge loss density on the basis of the transaction amount and the loss rate density; and a risk amount calculation means for calculating a risk amount from the calculated huge loss density.

What is disclosed in PTL 2 is an operational risk quantifying device, which quantifies an operational risk from a transaction amount distribution showing the state of distribution of transaction amounts and which includes: a smoothing means for smoothing the transaction amount distribution to create a smoothed transaction amount distribution; and an operational risk calculation means for calculating an operational risk from the smoothed transaction amount distribution created.

What is disclosed in PTL 3 is an operational risk management method for accumulating occurrences of a plurality of events associated with losses and managing an operational risk on the basis of the accumulated events. According to the operational risk management method, the transitional states of a plurality of events are set in response to each of a plurality of events that have occurred; in accordance with each of the transitional states of the events, a risk that will occur is predicted.

CITATION LIST

Patent Literature

{PTL 1} JP-A-2006-155427
{PTL 2} JP-A-2004-252893
{PTL 3} JP-A-2003-36343

Non-Patent Literature

{NPL 1} Kobayashi, Shimizu, Nishiguchi, Morinaga, "Challenge to sophisticated operational risk management," KINZAI INSTITUTE FOR FINANCIAL AFFAIRS, Chapter 3 Operational Risk Quantification Framework and Verification Thereof, pp. 108 to 144.

SUMMARY OF INVENTION

Technical Problem

The problem with the loss distribution calculation system of the related technology disclosed in NPL 1 is that the accuracy of obtained calculation results is not guaranteed. The reason is that random numbers are used in calculation. Those disclosed in PTLs 1 to 3 have the same problem.

The object of the present invention is to solve the above problem and provide a loss distribution calculation system that guarantees the accuracy of obtained calculation results.

Solution to Problem

According to a first aspect of the present invention, there is provided a loss distribution calculation system, comprising: a frequency distribution/scale distribution input section that inputs information about a frequency distribution and a scale distribution; a scale distribution discretization section that performs either one or both of upside and downside discretizations for the input scale distribution; a sub-composite distribution calculation section that calculates, after performing division of all events, a probability value of a cumulative sum of losses for a portion out of all events in order to calculate either one or both of an upside sub-composite distribution and a downside sub-composite distribution, said upside sub-composite distribution being calculated based on the frequency distribution and the upside-discretized scale distribution, and said downside sub-composite distribution being calculated based on the frequency distribution and the downside-discretized scale distribution; an accuracy calculation section that calculates upper and lower bounds of a loss distribution function based on either one or both of the upside and downside sub-composite distributions, calculates a function, as an approximate value of the loss distribution function, based on either one or both of the upside and downside sub-composite distributions, and calculates an accuracy of the approximate value; and a loss distribution output section that outputs information about the approximate value of the loss distribution function with guaranteed accuracy represented by information about the calculated accuracy.

According to a second aspect of the present invention, there is provided a loss distribution calculation method, comprising: inputting information about a frequency distribution and a scale distribution; performing either one or both of upside and downside discretizations for the input scale distribution; calculating, after performing division of all events, a probability value of a cumulative sum of losses for a portion out of all events in order to calculate either one or both of an upside sub-composite distribution and a downside sub-composite distribution, said upside sub-composite distribution being calculated based on the frequency distribution and the upside-discretized scale distribution, and said downside sub-composite distribution being calculated based on the frequency distribution and the downside-discretized scale distribution; calculating upper and lower bounds of a loss distribution function based on either one or both of the upside and downside sub-composite distributions, calculates a function, as an approximate value of the loss distribution function, based on either one or both of the upside and downside sub-composite distributions, and calculates an accuracy of the approximate value; and outputting information about the approximate value of the loss distribution function with guaranteed accuracy represented by information about the calculated accuracy.

According to a third aspect of the present invention, there is provided a loss distribution calculation program that causes a computer to execute: inputting information about a frequency distribution and a scale distribution; performing either one or both of upside and downside discretizations for the input scale distribution; calculating, after performing division of all events, a probability value of a cumulative sum of losses for a portion out of all events in order to calculate either one or both of an upside sub-composite distribution and a downside sub-composite distribution, said upside sub-composite distribution being calculated based on the frequency distribution and the upside-discretized scale distribution, and said downside sub-composite distribution being calculated based on the frequency distribution and the downside-discretized scale distribution; calculating upper and lower bounds of a loss distribution function based on either one or both of the upside and downside sub-composite distributions, calculates a function, as an approximate value of the loss distribution function, based on either one or both of the upside and downside sub-composite distributions, and calculates an accuracy of the approximate value; and outputting information about the approximate value of the loss distribution function with guaranteed accuracy represented by information about the calculated accuracy.

Advantageous Effects of Invention

A loss distribution calculation system, loss distribution calculation method and loss distribution calculation program according to the present invention guarantee the accuracy of obtained calculation results.

DESCRIPTION OF EMBODIMENTS

The following describes in detail an embodiment of a loss distribution calculation system, loss distribution calculation method and loss distribution calculation program of the present invention with reference to the accompanying drawings.

Figure 1:
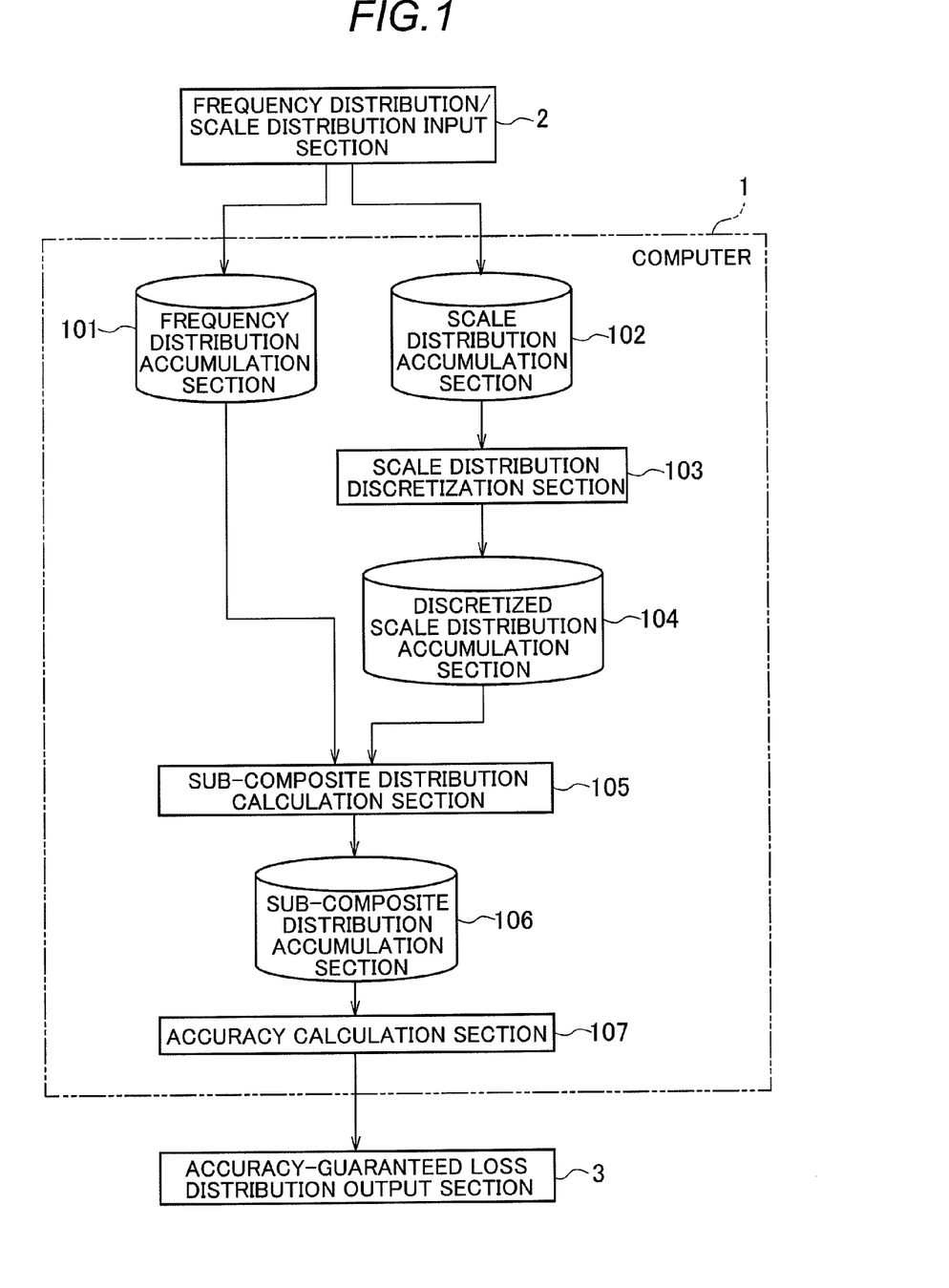
FIG. 1 A block diagram showing the configuration of a loss distribution calculation system according to an embodiment of the present invention.

With reference to FIG. 1, a loss distribution calculation system of the present embodiment includes a computer (Central processing unit; Processor; Data processing device) 1, which is controlled by programs to operate; a frequency distribution/scale distribution input section 2, which includes a communication device, a storage device and the like; and an accuracy-guaranteed loss distribution output section 3, which includes a communication device, a storage device, a computer and the like.

Among the above components, the computer 1 includes a frequency distribution accumulation section 101, a scale distribution accumulation section 102, a scale distribution discretization section 103, a discretized scale distribution accumulation section 104, a sub-composite distribution calculation section 105, a sub-composite distribution accumulation section 106, and an accuracy calculation section 107. Among the above components, the frequency distribution accumulation section 101, the scale distribution accumulation section 102 and the sub-composite distribution accumulation section 106 are included in a hard disk, a memory and any other storage device. The scale distribution discretization section 103, the sub-composite distribution calculation section 105 and the accuracy calculation section 107 are realized by the computer 1 reading and executing a loss distribution calculation program stored in a storage device (memory) thereof. In general, the above sections operate in the following manner.

The computer 1 captures a frequency distribution and a scale distribution, which are treated as inputs, via the frequency distribution/scale distribution input section 2 before performing a process described below. Then, the accuracy-guaranteed loss distribution output section 3 outputs information about the calculated loss distribution along with the accuracy thereof.

The frequency distribution input from the frequency distribution/scale distribution input section 2 is information for specifying a probability distribution as to the number of loss events during a holding period. Hereinafter, a probability variable indicating the number of loss events during a holding period is represented by N. A frequency distribution is a distribution that N follows. The frequency distribution may be specified by supplying information about each realization probability of N, such as "a probability of N=0, a probability of N=1, . . . "; or supplying information about the type of distribution, such as "Poisson distribution of $\lambda$=3.2," and information about a parameter thereof; or performing any other process. Hereinafter, a cumulative distribution function of a specified frequency distribution is represented by Pf(•). A probability function (probability mass function) of Pf(•) is represented by pf(•) The information about an input frequency distribution is accumulated in the frequency distribution accumulation section 101.

The scale distribution input from the frequency distribution/scale distribution input section 2 is information for specifying a probability distribution as to the scale of losses, each of which corresponds to each loss event during a holding period. Hereinafter, a probability variable indicating the scale of i-th loss event during a holding period is represented by L_i (i=1, . . . , N). In this case, L_i follows the same one distribution independently of other events regardless of what i is. That is, the scale distribution is a distribution which L_i follows for every i. The scale distribution may be specified by supplying information about each realization probability of L_i, such as "a probability of L_i=0, a probability of L_i=10.6, . . . "; or supplying information about the type of distribution, such as "Normal distribution of μ=3.238, σ=1," and information about a parameter thereof; or performing any other process. Hereinafter, a cumulative distribution function of a specified scale distribution is represented by Ps(•). When Ps(•) is a discrete distribution, a probability function (probability mass function) thereof is represented by ps(•). When Ps is a continuous distribution, a probability density function thereof is represented by ps(•). The information about an input scale distribution is accumulated in the scale distribution accumulation section 102.

With the use of the above symbols, the cumulative sum T of losses can be represented by T=L_1+ . . . +L_N. A probability distribution function thereof is represented by P(•) in this case. P(•) is a loss distribution. When P(•) is a discrete distribution, a probability function (probability mass function) thereof is p(•) in this case. When P(•) is a continuous distribution, a probability density function thereof is represented by p(•) in this case.

In general, the following probability distribution is referred to as a composite distribution of Pn and Pl: a probability distribution followed by a probability variable that is defined as R=1_1+ . . . +1_n with the use of a probability variable n, which follows a distribution function Pn and takes an integer greater than or equal to 0, and with the use of a probability variable 1_i, which follows a distribution function Pl and is independent of the other variable. A probability distribution function thereof is represented by P(•){Pn,Pl} in this case. The loss distribution P(•) is a composite distribution P(•){Pf, Ps} of Pf and Ps.

In the loss distribution calculation system of the above-described related technology, what has been common is a method of: repeatedly making many attempts of generating random numbers N that follow Pf(•) before generating N random numbers that follow Ps(•) and summing up the N random numbers to obtain the sum as T; and outputting an empirical distribution of the observed T as a loss distribution P(•). However, the loss distribution calculation system of the present embodiment outputs an accuracy-guaranteed loss distribution P(•), which is calculated by a process described below.

The scale distribution discretization section 103 uses the following procedure to perform either one or both of upside and downside discretizations for the scale distribution Ps(•) accumulated in the scale distribution accumulation section 102 to generate either one or both of an upside discretized scale distribution Us(•) and a downside discretized scale distribution Ds( ) which are then accumulated in the discretized scale distribution accumulation section 104. A probability function (probability mass function) of Us is represented by a symbol of "us" in this case. A probability function (probability mass function) of Ds is represented by a symbol of "ds" in this case.

The upside discretized scale distribution Us(•) is defined as a distribution of a discrete random variable LU_i, which approximates a probability variable L_i that follows a scale distribution Ps(•) at upside. The upside discretized scale distribution Us(•) is calculated in the following manner: If a value range of LU_i is {GU_1, . . . , GU_α}, a discrete random variable whose value is determined by LU_i=GU_k when GU_(k−1)<L_i≤GU_k is regarded as LU_i, and a probability distribution function thereof is represented by Us(•).

The value range of LU_i may be set at regular intervals, like 1 million yen, 2 million yen and 3 million yen. Instead of being set at regular intervals, interested amounts in the loss distribution may be arranged. For convenience, GU_1 may be set to −∞, and GU_α to +∞; or GU_1 and GU_α may be set to sufficiently small and large amounts so as to cover the corresponding value ranges of Ps.

Us(•) can be easily calculated with the use of Ps(•) in the following manner:
Us (LU_i)=Ps(GU_k)
for GU_k≤LU_i<GU_(k+1)

LU_i is a probability variable that is so defined as to always take a value greater than or equal to L_i. Accordingly, LU_1+ . . . +LU_N always take a value greater than or equal to L_1+ . . . +L_N, respectively. That is, the above means that a composite distribution P(•){Pf,Us} of a frequency distribution Pf and an upside discretized scale distribution Us has a curve at the right side of a curve of a loss distribution P(•){Pf,Ps}. The loss distribution is a monotone increasing function.

Therefore, for arbitrarily given T, the following holds true:

$$P(T)\{Pf,Us\} \leq P(T)\{Pf,Ps\} \quad \text{(Formula 1)}$$

The downside discretized scale distribution Ds(•) is defined as a distribution of a discrete random variable LD_i, which approximates a probability variable L_i that follows a scale distribution Ps(•) at downside. The downside discretized scale distribution Ds(•) is calculated in the following manner: If a value range of LD_i is {GD_1, . . . , GD_β}, a discrete random variable whose value is determined by LD_i=GD_k when GD_k<L_i≤Gd_(k+1) is regarded as LD_i, and a probability distribution function thereof is represented by Ds(•). The value range of LD_i may be set at regular intervals, like 1 million yen, 2 million yen and 3 million yen. Instead of being set at regular intervals, interested amounts in the loss distribution may be arranged. The value range of LD_i is not required to be the same as the value range of Us. For convenience, GD_1 may be set to −∞, and GD_α to +∞; or GD_1 and GD_α may be set to sufficiently small and large amounts so as to cover the corresponding value ranges of Ps.

Ds(•) can be easily calculated with the use of Ps(•) in the following manner:

$$Ds(LD\_i)=Ps(GD\_k)$$

for $GD\_(k-1)<LD\_i \leq GD\_k$

LD_i is a probability variable that is so defined as to always take a value less than or equal to L_i. Accordingly, LD_1+ . . . +LD_N always take a value less than or equal to L_1+ . . . +L_N, respectively. That is, the above means that a composite distribution P(•) {Pf, Ds} of a frequency distribution Pf and a down discretized scale distribution Ds has a curve at the left side of the curve of a loss distribution P(•)

{Pf,Ps}. The loss distribution is a monotone increasing function. Therefore, for arbitrarily given T, the following holds true:

$$P(T)\{Pf,Ps\} \leq P(T)\{Pf,Ds\} \quad \text{(Formula 2)}$$

Incidentally, the upside and downside discretized scale distributions are not necessarily accumulated in the discretized scale distribution accumulation section 104 in the form of a probability distribution function. The distributions may be accumulated in the form of a probability function (probability mass function).

The sub-composite distribution calculation section 105 calculates either one or both of an upside and downside sub-composite distributions on the basis of the frequency distribution accumulated in the frequency distribution accumulation section 101 and either one of or both of the upside and downside discretized scale distributions accumulated in the discretized scale distribution accumulation section 104 by following a procedure described below; and accumulates either one or both of the upside and downside sub-composite distributions in the sub-composite distribution accumulation section 106.

In general, in any probability distribution function P(x), because of Bayes' formula, the following equation holds for division of all events, i.e. a set of events $$\{A\_1, \ldots, A\_\gamma\} \text{ for which } A\_i \wedge A\_j = 0 \text{ (when } i \neq j\text{)}$$
$$\text{and } A\_1 V, \ldots, V A\_\gamma = \Omega$$

(All events):

$$P(x) = Pr\{A\_1\} * P(x|A\_1) + \ldots + Pr\{A\_\gamma\} * P(x|A\_\gamma)$$

where an occurrence probability of event A_i is represented by Pr{A_i}.

The upside sub-composite distribution is a portion of the composite distribution P(•){Pf,Us} of the frequency and upside discretized scale distributions, which is calculated by the above Bayes' formula after A_i is defined by the number of loss events.

That is, when a subset of instances of N is NU= {NU_1, ..., NU_δ} (NU_i is an integer greater than or equal to 0), the following always holds true: P(T){Pf, Us}=Pr{N=NU_1}*P(T|N=NU_1)+...+Pr{N=NU_δ}*P(T|N=NU_δ)+Pr{N takes a value other than NU}*P(T|N takes a value other than NU). The upside sub-composite distribution P(•) {Pf,Us}_NU is defined by deleting the last term from the above equation:

$$P(T)\{Pf,Us\}\_NU = Pr\{N=NU\_1\}*P(T|N=NU\_1) + \ldots + Pr\{N=NU\_\delta\}*P(T|N=NU\_\delta).$$

Here, Pr{N=NU_i} is pf(NU_i). P(T|N=NU_i) is a distribution function regarding the sum of NU_i discrete random variables that follow probability distributions Us independently of each other. Therefore, P(T|N=NU_i) can be calculated using a well-known technique. The upside sub-composite distribution P(T){Pf, Us}_NU is the total sum of products of pf(NU_i) and P(T|N=NU_i) with respect to NU. Therefore, the upside sub-composite distribution P(T){Pf, Us}_NU can be easily calculated.

Pr{N takes a value other than NU} is calculated by 1−(pf(NU_1)+ ... +pf(NU_δ)), and is therefore represented by a symbol of "ϵ". P(T|N takes a value other than NU) is a probability distribution function, and is therefore in a range between 0 and 1. Given the above, it is clear that Pr{N takes a value other than NU}*P(T|N takes a value other than NU), which is not included in the definition of the sub-composite distribution, is in a range between 0 and ϵ.

That is, for arbitrarily given T, the following formula holds true:

$$P(T)\{Pf,Us\}\_NU \leq P(T)\{Pf,Us\} \leq P(T)\{Pf,Us\}\_NU + \epsilon \quad \text{(Formula 3)}$$

The downside sub-composite distribution is a portion of the composite distribution P(•) {Pf,Ds} of the frequency and downside discretized scale distributions, which is calculated by the above Bayes' formula after A_i is defined by the number of loss events.

That is, when a subset of instances of N is ND= {ND_1, ..., ND_δ'} (ND_i is an integer greater than or equal to 0), the following always holds: P(T){Pf, Ds}=Pr{N=ND_1}*P(T|N=ND_1)+ ... +Pr{N=ND_δ}*P(T|N=NU_δ')+Pr{N takes a value other than ND}*P(T|N takes a value other than ND). The downside sub-composite distribution P(•){Pf, Ds}_ND is defined by deleting the last term from the above equation:

$$P(T)\{Pf,Ds\}\_ND = Pr\{N=ND\_1\}*P(T|N=ND\_1) + \ldots + Pr\{N=ND\_\delta\}*P(T|N=ND\_\delta').$$

Here, Pr{N=ND_i} is pf(ND_i). P(T|N=ND_i) is a distribution function regarding the sum of ND_i discrete random variables that follow probability distributions Ds independently of each other. Therefore, P(T|N=ND_i) can be calculated using a well-known technique. The downside sub-composite distribution P(T){Pf, Ds}_ND is the sum total of products of pf(ND_i) and P(T|N=ND_i) with respect to ND. Therefore, the downside sub-composite distribution P(T) {Pf, Ds}_ND can be easily calculated.

Pr{N takes a value other than ND} is calculated by 1−(pf(ND_1)+ ... +pf(ND_δ')), and is therefore represented by a symbol of "ϵ'". P(T|N takes a value other than ND) is a probability distribution function, and is therefore in a range between 0 and 1. Given the above, it is clear that Pr{N takes a value other than ND}*P(T|N takes a value other than ND), which is not included in the definition of the sub-composite distribution, is in a range between 0 and ϵ'.

That is, for arbitrarily given T, the following formula holds true:

$$P(T)\{Pf,Ds\}\_ND \leq P(T)\{Pf,Ds\} \leq P(T)\{Pf,Ds\}\_ND + \epsilon' \quad \text{(Formula 4)}$$

The sets NU and ND may be different from each other. Each of the sets NU and ND may be defined as a continuous range, such as an "integer in a range between 0 and δ," and defined as δ elements starting from N for which pf(N) is large. The sets NU and ND may be defined in a different manner depending on how easy the calculation is, or for any other reason.

The upside sub-composite distribution and the downside sub-composite distribution are not necessarily accumulated in the sub-composite distribution accumulation section 106 in the form of a probability distribution function. The upside and downside sub-composite distributions may be accumulated in the form of a probability function (probability mass function); or only a value of particularly interested T may be held; or alternatively several values of an inverse function thereof may be held.

The accuracy calculation section 107 calculates, by following a procedure described below, a maximum diversion range from a loss distribution for either one or both of the upside and downside sub-composite distributions accumulated in the sub-composite distribution accumulation section 106; and supplies either one or both of the upside and downside sub-composite distributions together with the calculation results as accuracy to the accuracy-guaranteed loss distribution output section 3.

To summarize the formulas 1 to 4, the loss distribution P(T) has the following relationship with the upside sub-composite distribution P(T){Pf,Us}_NU and the downside sub-composite distribution P(T){Pf,Ds}_ND with respect to arbitrarily given T:

$$P(T)\{Pf,Us\}\_NU \leq P(T) \leq P(T)\{Pf,Ds\}\_ND+\epsilon' \quad \text{(Formula 5)}$$

Hereinafter, in order to express the above formula in a simple manner, the leftmost side of the above formula is represented by LEFT(T), and the rightmost side by RIGHT(T). That is, if LEFT(T)=P(T){Pf,Us}_NU and if RIGHT(T)=P(T){Pf, Ds}_ND+ε', the formula (5) is expressed as follows:

$$\text{LEFT}(T) \leq P(T) \leq \text{RIGHT}(T).$$

As for arbitrarily given T, the accuracy calculation section 107 outputs a value L'(T), which is greater than or equal to LEFT(T), as an approximate calculation result of a loss distribution P(T); and outputs, as the accuracy thereof, a difference EL(T) between L'(T) and LEFT(T). As a result, a true loss-distribution value (not containing an error) does not go below LEFT(T). Thus, the accuracy is guaranteed in such a way that the true loss-distribution value does not become less than or equal to the value which deviates from L'(T) by EL(T) downwardly.

Moreover, as for arbitrarily given T, the accuracy calculation section 107 outputs a value R'(T), which is less than or equal to RIGHT(T), as an approximate calculation result of a loss distribution P(T); and outputs, as the accuracy thereof, a difference ER(T) between R'(T) and RIGHT(T). As a result, a true loss-distribution value (not containing an error) does not go above RIGHT(T). Thus, the accuracy is guaranteed in such a way that the true loss-distribution value does not become greater than or equal to the value which deviates from R'(T) by ER(T) upwardly.

Moreover, as for arbitrarily given T, the accuracy calculation section 107 outputs M'(T), which is in a range between LEFT(T) and RIGHT(T), as an approximate calculation result of a loss distribution P(T); and also outputs, as the accuracies thereof, the difference EL(T) between M'(T) and LEFT(T) and the difference ER(T) between M'(T) and RIGHT(T). As a result, the accuracy is guaranteed in such a way that a true loss-distribution value is within the range, a lower limit of which deviates from M'(T) by EL(T) downwardly and a upper limit of which deviates from M'(T) by ER(T) upwardly.

Incidentally, there is a special case where the accuracy calculation section 107 outputs LEFT itself as L' or RIGHT itself as R'. This case is regarded as a case where the accuracy calculation section 107 directly outputs a range itself within which the value of P(T) falls, rather than a case where the accuracy calculation section 107 outputs an approximate calculation result of P(T) and a guaranteed accuracy. The output from the accuracy calculation section 107 may be related to only interested T, instead of relating to arbitrarily given T.

In the field of risk management, in some cases, an inverse function of P(T) defined by VaR (Value at Risk) or the like is more important than P(T) itself. If the inverse functions of LEFT(T) and RIGHT(T) are represented by u(y) and d(y), respectively, and the inverse function of P(T) by q(y), the following formula holds for arbitrarily given y because of the formula 5 and the monotonically increasing nature of each function:

$$d(y) \leq q(y) \leq u(y) \quad \text{(Formula 6)}$$

In this case, the so-called VaR or the like may be employed as the definition of an inverse function of a function that is not monotonically increasing in a limited sense.

The accuracy calculation section 107 may be so designed as to output, with guarantee, the fact that the loss distribution q(y) is greater than or equal to d(y) and is less than or equal to u(y). The accuracy calculation section 107 outputs an approximate calculation result of q(y), and calculates the guaranteed accuracy in this case, in a similar way to a case where the approximate calculation result of P(T) is output. If only one of d(y) and u(y) is output, then accuracy is guaranteed at one end. If both of d(y) and u(y) are output, then accuracy is guaranteed at both ends. A special case where d(y) or u(y) itself is output as an approximate calculation result of q(y) is regarded as a case where an output is a range within which q(y) itself falls. Even in this case, the output from the accuracy calculation section 107 may be related to only an interested group of y. In these cases, the present system outputs the accuracy-guaranteed VaR.

When the accuracy thus calculated does not satisfy a desired level that is preset or specified by a user, control may be performed in such a way that the process of the sub-composite distribution accumulation section 106 and subsequent processes are retried after an element is added to NU or ND. Even when an element is added to NU or ND, it is not necessary to calculate sub-composite distributions, δ and δ' all over again. All that is required is to perform an addition of Pr{N=NA}*P(T|N=NA) portion associated with the added element NA to a sub-composite distribution, and a subtraction operation of Pr{N=NA} from δ or δ'. In general, when the element NA is added, a term of Pr{N takes a value other than NU}*P{T|N takes a value other than NU}, which is excluded from the definition of a sub-composite distribution and is equivalent to what is called error, becomes smaller, thereby contributing to an improvement in accuracy.

Figure 2:
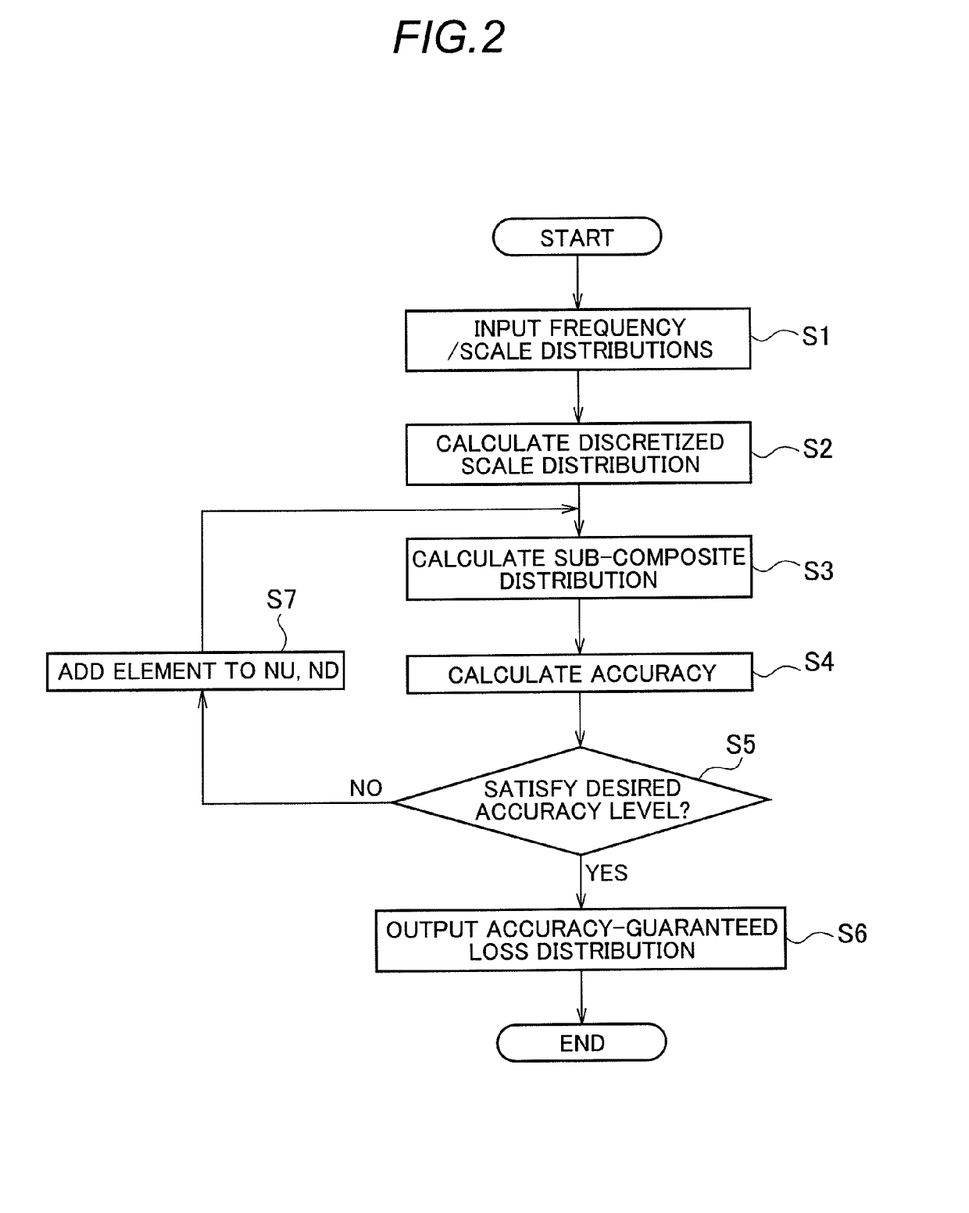
FIG. 2 A flowchart showing an operation of the loss distribution calculation system according to an embodiment of the present invention.

With reference to flowcharts of FIGS. 1 and 2, an overall operation of the present embodiment will be described in detail.

First, the frequency distribution/scale distribution input section 2 inputs information about a frequency distribution and information about a scale distribution, which are then accumulated in the frequency distribution accumulation section 101 and the scale distribution accumulation section 102, respectively (Step S1).

Then, the scale distribution discretization section 103 performs either one or both of upside or downside discretizations for the scale distribution accumulated in the scale distribution accumulation section 102; generates either one or both of upside and downside discretized scale distributions; and accumulates the generated distributions in the discretized scale distribution accumulation section 104 (Step S2).

Then, the sub-composite distribution calculation section 105 calculates either one or both of upside and downside sub-composite distributions based on the frequency distribution accumulated in the frequency distribution accumulation section 101 and either one or both of the upside and downside discretized scale distributions accumulated in the discretized scale distribution accumulation section 104. The sub-composite distribution calculation section 105 accumulates the calculated distribution in the sub-composite distribution accumulation section 106 (Step S3).

Then, the accuracy calculation section 107 uses the formula 5 to calculate the accuracy of either one or both of the upside and downside sub-composite distributions accumulated in the sub-composite distribution accumulation section 106 (Step S4). If a determination as to whether the accuracy has reached a desired level is required, the determination is made (Step S5).

If it is determined that the accuracy has reached the level as a result (YES at step S5) or if the determination is not required, the accuracy-guaranteed loss distribution output section 3 outputs an approximate calculation result of a loss distribution (or an approximate calculation result of an inverse function, such as VaR) along with accuracy information (Step S6). Meanwhile, if it is not determined that the accuracy has not reached the desired level (NO at step S5), an element is added to either one or both of NU and ND (Step S7), and the sub-composite distribution calculation and subsequent processes are repeated.

As described above, the loss distribution calculation system of the present embodiment includes the scale distribution discretization section 103, the sub-composite distribution calculation section 105 and the accuracy calculation section 107, outputs a portion (sub-composite distribution) of a loss distribution that is calculated using a discretized scale distribution without generating random numbers as a calculation result, and outputs a theoretical maximum diversion from the loss distribution as accuracy of the calculation result.

The following describes the advantageous effects of the present embodiment.

According to the present embodiment, the loss distribution calculation system is so configured as not to use random numbers in calculation and to calculate, for a to-be-calculated loss distribution, upper and lower bounds of a function value thereof. Therefore, it is possible to guarantee the accuracy of the loss distribution output. That is, the first advantage is that the loss distribution can be output with the guaranteed accuracy of calculation results.

Moreover, according to the present embodiment, the loss distribution calculation system is so configured as to be able to perform an additional calculation process aimed at further increasing the accuracy only when the accuracy has not reached the desired level. Therefore, it is possible to give a possibility of shortening the calculation-process time by refraining from unnecessary calculation processes. That is, the second advantage is that it is possible to give a possibility of shortening the calculation-process time by putting an end to the calculation process at a time when the accuracy has reached the level desired by a user and refraining from unnecessary calculation processes.

Example

The following describes an operation of the present embodiment using a specific example.

First, the frequency distribution/scale distribution input section 2 inputs a Poisson distribution with a parameter of 20 as a frequency distribution; and a logarithmic normal distribution with an average of 25,000 and a standard deviation of 15,000 as a scale distribution.

Then, in the scale distribution discretization section 103, the above scale distribution is discretized. In this case, both of an upside discretized scale distribution and a downside discretized scale distribution are generated. The value ranges of both of LU and LD are a collection of numbers leading up to 1,000,000 at intervals of 1,000, i.e., 0, 1,000, 2,000, . . . , 1,000,000.

Then, in the sub-composite distribution calculation section 105, an upside sub-composite distribution is generated with the frequency distribution and the above upside discretized scale distribution, and a downside sub-composite distribution is generated with the frequency distribution and the above downside discretized scale distribution. Both of the sets of NU and ND are integers greater than or equal to 0 and less than or equal to 20, which are equal to $\{0, 1, \ldots, 20\}$.

Figure 3:
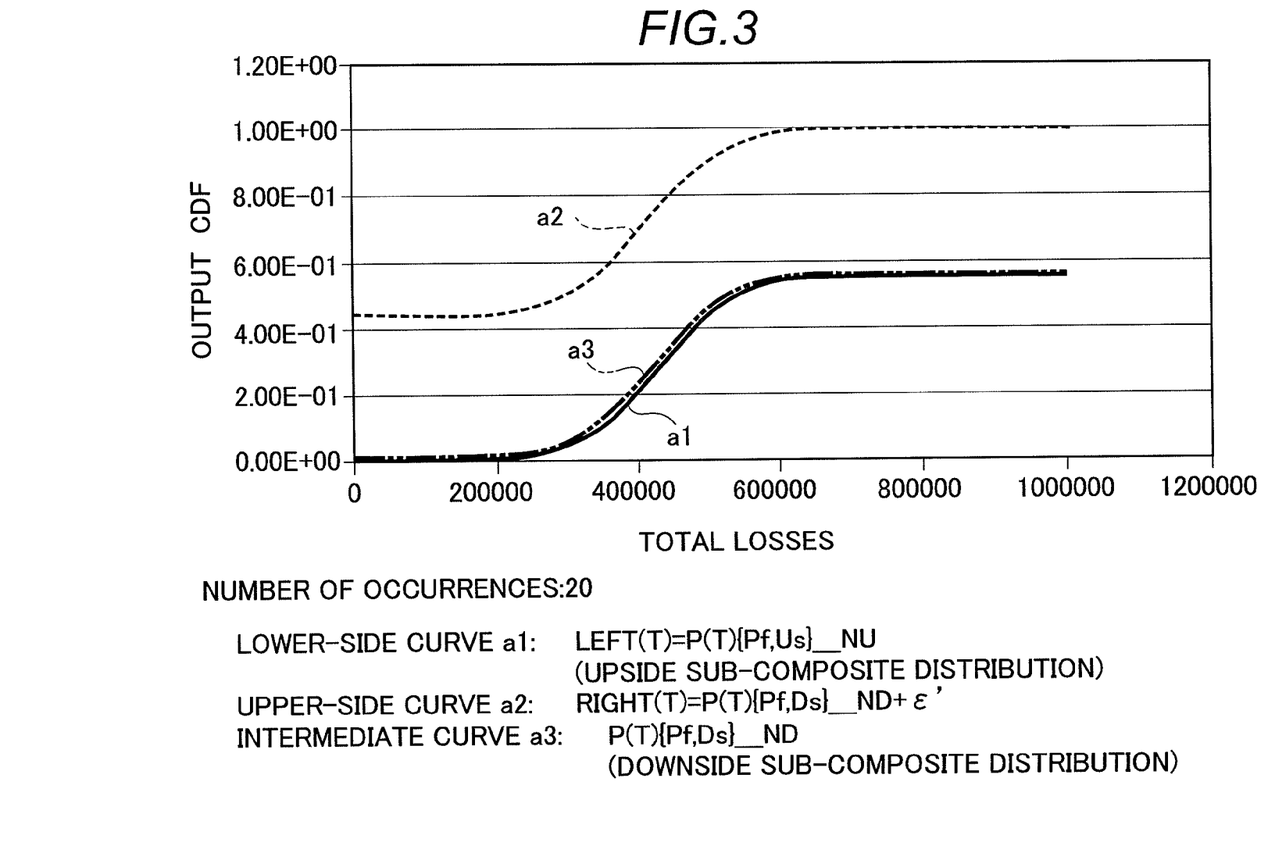
FIG. 3 A graph showing outputs for N less than or equal to 20 in an example of the present invention.

At this time, LEFT(T) and RIGHT(T) output from the accuracy calculation section 107 are as shown in FIG. 3. The curve a1 in the lower area of FIG. 3 represents LEFT(T)=P(T){Pf,Us}_NU, i.e. the upside sub-composite distribution. The curve a2 in the upper area of FIG. 3 represents RIGHT(T)=P(T){Pf, Ds}_ND+$\epsilon'$. Moreover, in FIG. 3, the intermediate curve a3, which is behind the lower-side curve a1 and hard to visually recognize, is P(T){Pf, Ds}_ND, i.e. the downside sub-composite distribution.

A loss distribution in the above frequency distribution/ scale distribution is guaranteed to be between the upper-side curve a1 and lower-side curve a2 of FIG. 3. That is, the accuracy is guaranteed with the two curves a1 and a2 as upper and lower bounds, respectively; a function between the curves a1 and a2 can be output as an approximate calculation result of the loss distribution.

In FIG. 3, there is still a space between the upper-side and lower-side curves a1 and a2. If the accuracy has not reached a desired level, an element is then added to NU or ND, and calculation is performed again. Therefore, it is possible to output the approximate calculation result of the loss distribution with a higher degree of accuracy guaranteed.

Figure 4:
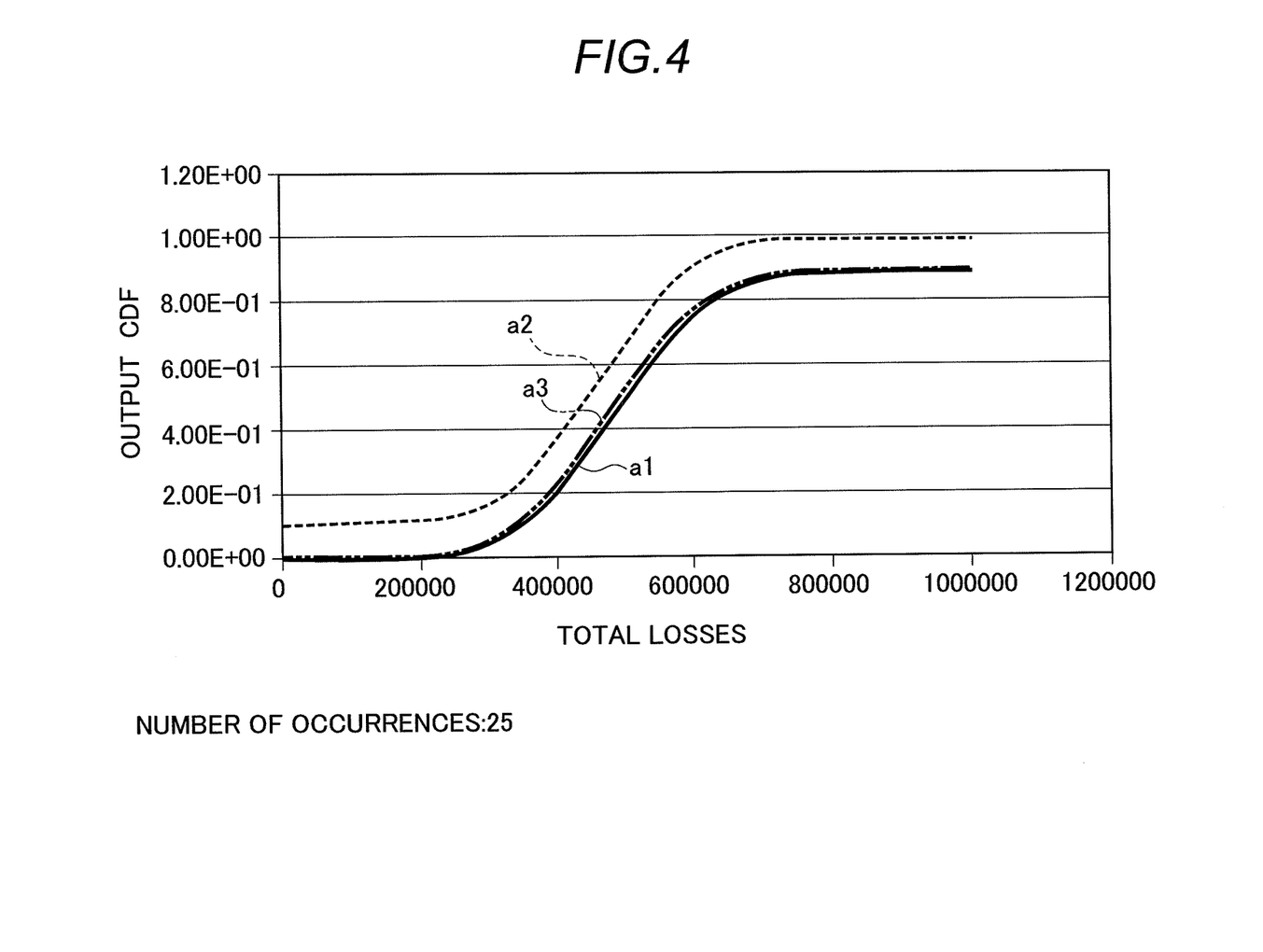
FIG. 4 A graph showing outputs for N less than or equal to 25 in an example of the present invention.
Figure 5:
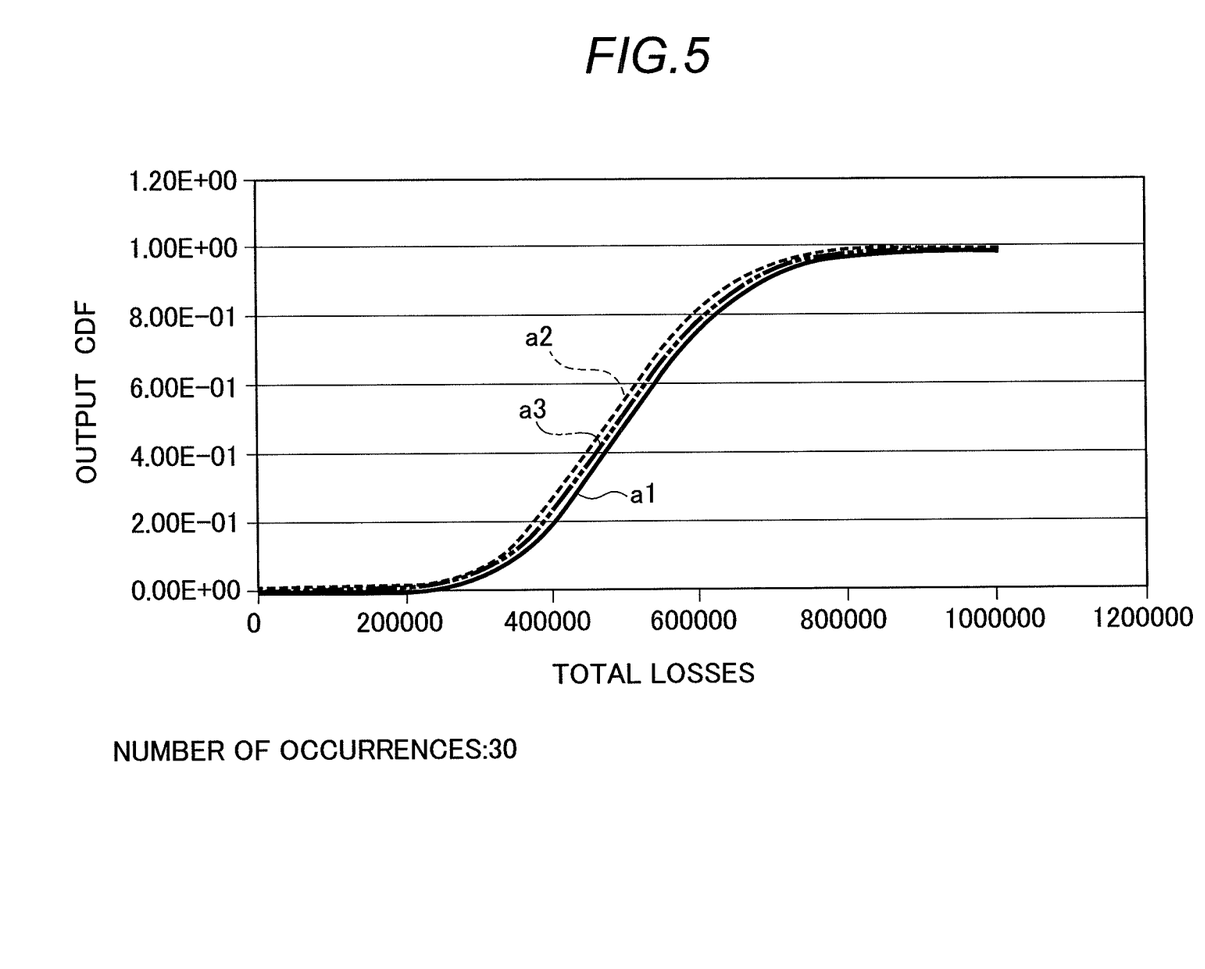
FIG. 5 A graph showing outputs for N less than or equal to 30 in an example of the present invention.

FIG. 4 shows results of the case where the sets of NU and ND are both set to integers greater than or equal to 0 and less than or equal to 25, which are equal to $\{0, 1, \ldots, 25\}$. FIG. 5 shows results of the case where the sets of NU and ND are both set to integers greater than or equal to 0 and less than or equal to 30, which are equal to $\{0, 1, \ldots, 30\}$. In FIGS. 4 and 5, the three curves a1, a3 and a2 from bottom to top are similarly LEFT(T), which is an upside sub-composite distribution, a downside sub-composite distribution, and RIGHT(T), respectively. It is clear from each of the results of FIGS. 3 to 5 that adding an element makes the distance between the upper-side and lower-side curves a1 and a2 narrower, contributing an improvement in the accuracy of calculation of the loss distribution.

Figure 6:
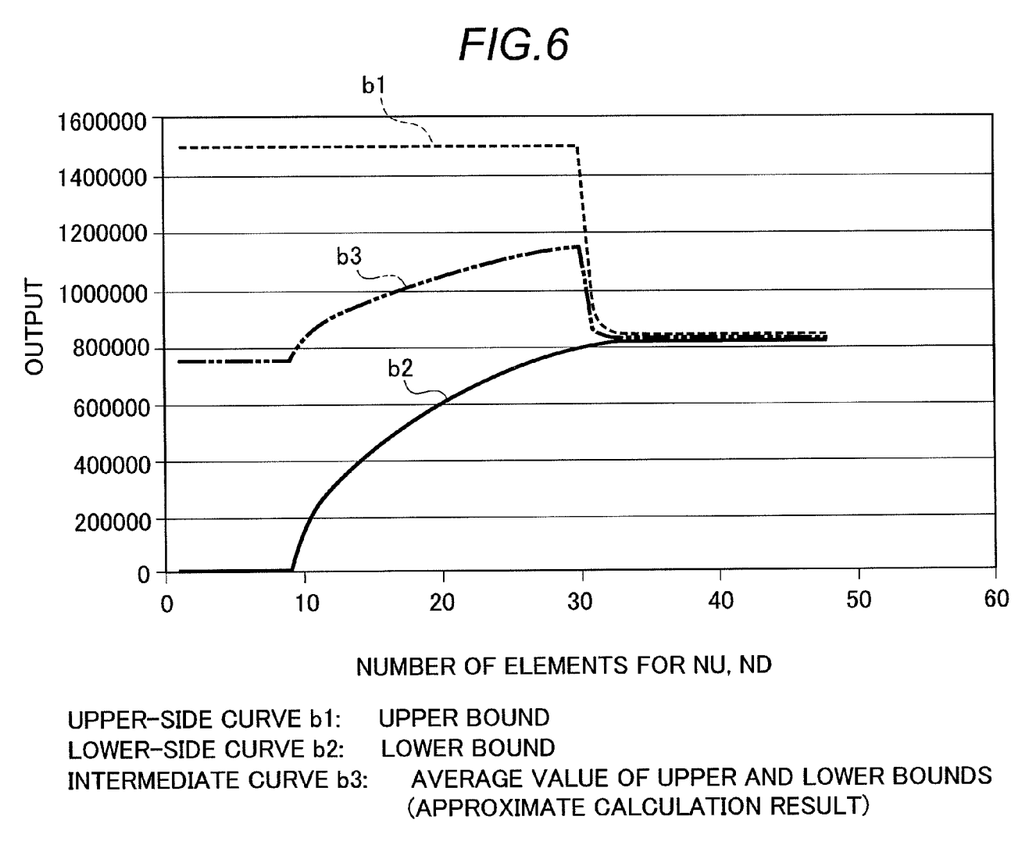
FIG. 6 A graph showing outputs when an inverse function of P(T) is calculated with N varying in an example of the present invention.

FIG. 6 shows results of a process of adding one element after another to the sets of NU and ND, like $\{0\}$, $\{0, 1\}$ and $\{0, 1, 2\}$, and of outputting the value range of an inverse function of P(T) at 0.99, i.e. upper bound u(0.99) and lower bound d(0.99) of values of q(0.99). In FIG. 6, the horizontal axis represents that a set having a lower limit of 0 and an upper limit of the value of the horizontal axis is used as each of sets of NU and ND, the vertical axis represents a value of the output. The upper-side curve b1 represents a upper bound. The lower-side curve b2 represents a lower bound. The intermediate curve b3 represents the average value of the upper and lower bounds, which is output as an approximate calculation result. True q(0.99) is guaranteed to be therebetween. It is clear from the results of FIG. 6 that increasing the number of elements of NU and ND makes the distance between the curves narrower, contributing to an improvement in accuracy even in terms of a value of an inverse function.

Incidentally, the above loss distribution calculation system and loss distribution calculation method can be realized by hardware, software or a combination of hardware and software.

For example, the above loss distribution calculation system can be realized by hardware. Instead, the loss distribution calculation system may be realized by a computer that reads from a recording medium a program, which causes the computer to function as the system, and executes the program.

The loss distribution calculation method can be realized by hardware. Instead, the loss distribution calculation method may be realized by a computer that reads from a computer-readable recording medium a program, which causes the computer to carry out the method, and executes the program.

The hardware and software configuration described above is not limited to a specific one. Any type can be applied as long as each of the functions of the above-described sections can be realized. For example, individual sections may be formed for each of the functions of the above-described sections; or alternatively, the functions of the sections may be formed integrally.

Part or all of the above-described embodiment may be described as in the following appendixes, but is not limited to the following.

APPENDIX 1

A loss distribution calculation system, comprising: a frequency distribution/scale distribution input section that inputs information about a frequency distribution and a scale distribution; a scale distribution discretization section that performs either one or both of upside and downside discretizations for the input scale distribution; a sub-composite distribution calculation section that calculates, after performing division of all events, a probability value of a cumulative sum of losses for a portion out of all events in order to calculate either one or both of an upside sub-composite distribution and a downside sub-composite distribution, said upside sub-composite distribution being calculated based on the frequency distribution and the upside-discretized scale distribution, and said downside sub-composite distribution being calculated based on the frequency distribution and the downside-discretized scale distribution; an accuracy calculation section that calculates upper and lower bounds of a loss distribution function based on either one or both of the upside and downside sub-composite distributions, calculates a function, as an approximate value of the loss distribution function, based on either one or both of the upside and downside sub-composite distributions, and calculates an accuracy of the approximate value; and a loss distribution output section that outputs information about the approximate value of the loss distribution function with guaranteed accuracy represented by information about the calculated accuracy.

APPENDIX 2

The loss distribution calculation system according to Appendix 1, wherein if the calculated accuracy has not reached a desired level, then the sub-composite distribution calculation section enlarges a range of a portion where a probability value is calculated in the division of the all events and calculates again either one or both of the upside and downside sub-composite distributions.

APPENDIX 3

The loss distribution calculation system according to Appendix 1 or 2, further comprising: a frequency distribution accumulation section in which information about the frequency distribution input by the frequency distribution/scale distribution input section is accumulated; a scale distribution accumulation section in which information about the scale distribution input by the frequency distribution/scale distribution input section is accumulated; a discretized scale distribution accumulation section in which the scale distribution for which either one or both of the upside and downside discretizations are performed by the scale distribution discretization section is accumulated; and a sub-composite distribution accumulation section in which the upside or downside sub-composite distribution calculated by either one or both of the sub-composite distribution calculation sections are accumulated.

APPENDIX 4

The loss distribution calculation system according to any one of claims 1 to 3, wherein a computer functions as the scale distribution discretization section, the sub-composite distribution calculation section and the accuracy calculation section.

APPENDIX 5

A loss distribution calculation method, comprising: inputting information about a frequency distribution and a scale distribution; performing either one or both of upside and downside discretizations for the input scale distribution; calculating, after performing division of all events, a probability value of a cumulative sum of losses for a portion out of all events in order to calculate either one or both of an upside sub-composite distribution and a downside sub-composite distribution, said upside sub-composite distribution being calculated based on the frequency distribution and the upside-discretized scale distribution, and said downside sub-composite distribution being calculated based on the frequency distribution and the downside-discretized scale distribution; calculating upper and lower bounds of a loss distribution function based on either one or both of the upside and downside sub-composite distributions, calculates a function, as an approximate value of the loss distribution function, based on either one or both of the upside and downside sub-composite distributions, and calculates an accuracy of the approximate value; and outputting information about the approximate value of the loss distribution function with guaranteed accuracy represented by information about the calculated accuracy.

APPENDIX 6

The loss distribution calculation method according to Appendix 5, further comprising: if the calculated accuracy has not reached a desired level, then enlarging a range of a portion where a probability value is calculated in the division of the all events and calculating again either one or both of the upside and downside sub-composite distributions.

APPENDIX 7

A loss distribution calculation program that causes a computer to execute: inputting information about a frequency distribution and a scale distribution; performing either one or both of upside and downside discretizations for the input scale distribution; calculating, after performing division of all events, a probability value of a cumulative sum of losses for a portion out of all events in order to calculate either one or both of an upside sub-composite distribution and a downside sub-composite distribution, said upside sub-composite distribution being calculated based on the frequency distribution and the upside-discretized scale distribution, and said downside sub-composite distribution being calculated based on the frequency distribution and the downside-discretized scale distribution; calculating upper and lower bounds of a loss distribution function based on either one or both of the upside and downside sub-composite distributions, calculates a function, as an approximate value of the loss distribution function, based on either one or both of the upside and downside sub-composite distributions, and calculates an accuracy of the approximate value; and outputting information about the approximate value of the loss distribution function with guaranteed accuracy represented by information about the calculated accuracy.

APPENDIX 8

The loss distribution calculation program according to Appendix 7, that further causes a computer to execute:
if the calculated accuracy has not reached a desired level, then enlarging a range of a portion where a probability value is calculated in the division of the all events and calculating again either one or both of the upside and downside sub-composite distributions.

The above has described the present invention with reference to the embodiment and example. However, the present invention is not limited to the above embodiment and example. Various modifications apparent to those skilled in the art may be made in the configuration and details of the present invention within the scope of the present invention.

The present application claims priority from Japanese Patent Application No. 2009-220731 filed on Sep. 25, 2009, the entire contents of which being incorporated herein by reference.

INDUSTRIAL APPLICABILITY

The present invention can be applied for use in damage insurance, operational risk management or the like to allow a business operator, who analyzes the distribution of a cumulative sum of losses during a holding period, to acquire a loss distribution that is guaranteed in accuracy. The present invention can be also applied for use in the case where the business operator performs as little calculation as possible by refraining from unnecessary calculation operations in acquiring a loss distribution that holds a required degree of accuracy.

REFERENCE SIGNS LIST

1: Computer
2: Frequency distribution/scale distribution input section
3: Accuracy-guaranteed loss distribution output section
101: Frequency distribution accumulation section
102: Scale distribution accumulation section
103: Scale distribution discretization section
104: Discretized scale distribution accumulation section
105: Sub-composite distribution calculation section
106: Sub-composite distribution accumulation section
107: Accuracy calculation section

The invention claimed is:

1. A loss distribution calculation system, comprising:
a frequency distribution/scale distribution input section configured to input information about a frequency distribution and a scale distribution;
a scale distribution discretization section configured to perform either one or both of upside and downside discretizations for the input scale distribution;
a sub-composite distribution calculation section configured to calculate, after performing division of all events, a probability value of a cumulative sum of losses for a portion out of all the events in order to calculate either one or both of an upside sub-composite distribution and a downside sub-composite distribution, said upside sub-composite distribution being calculated based on the frequency distribution and the upside-discretized scale distribution, and said downside sub-composite distribution being calculated based on the frequency distribution and the downside-discretized scale distribution;
an accuracy calculation section configured to calculate:
upper and lower bounds of a loss distribution function based on either one or both of the upside and downside sub-composite distributions,
a function, as an approximate value of the loss distribution function, based on either one or both of the upside and downside sub-composite distributions, and
an accuracy of the approximate value; and
a loss distribution output section configured to output information about the approximate value of the loss distribution function, with guaranteed accuracy, represented by information about the calculated accuracy,
wherein:
each of the frequency distribution/scale distribution input section, the scale distribution discretization section, the sub-composite distribution calculation section, the accuracy calculation section, and the loss distribution output section is implemented using hardware;
the upside sub-composite distribution is the total sum of products of a first probability function and a first distribution function, with respect to a subset of instances of a probability variable indicating the number of loss events;
the first probability function is a probability function of a cumulative distribution function of the frequency distribution;
the first distribution function is a distribution function regarding the sum of plural discrete random variables dependent on the upside-discretized scale distribution; and
the downside sub-composite distribution is the total sum of products of a second probability function and a second distribution function, with respect to a subset of instances of a probability variable indicating the number of loss events;
the second probability function is a probability function of a cumulative distribution function of the frequency distribution; and
the second distribution function is a distribution function regarding the sum of plural discrete random variables dependent on the downside-discretized scale distribution.

2. The loss distribution calculation system according to claim 1, wherein
if the calculated accuracy has not reached a desired level, then the sub-composite distribution calculation section enlarges a range of a portion where a probability value is calculated in the division of the all events and calculates again either one or both of the upside and downside sub-composite distributions, and
when the calculated accuracy has reached a desired level, the loss distribution output section outputs the information about the approximate value of the loss distribution function with guaranteed accuracy represented by information about the calculated accuracy.

3. The loss distribution calculation system according to claim 1, further comprising:
a frequency distribution accumulation section in which information about the frequency distribution input by the frequency distribution/scale distribution input section is accumulated;
a scale distribution accumulation section in which information about the scale distribution input by the frequency distribution/scale distribution input section is accumulated;

a discretized scale distribution accumulation section in which the scale distribution for which either one or both of the upside and downside discretizations are performed by the scale distribution discretization section is accumulated; and a sub-composite distribution accumulation section in which the upside or downside sub-composite distribution calculated by either one or both of the sub-composite distribution calculation sections are accumulated, wherein each of the frequency distribution accumulation section, the scale distribution accumulation section, the discretized scale distribution accumulation section, and the sub-composite distribution accumulation section is implemented using hardware.

4. The loss distribution calculation system according to claim 1, wherein a computer functions as the scale distribution discretization section, the sub-composite distribution calculation section and the accuracy calculation section.

5. A loss distribution calculation method of a loss distribution calculation system, the method comprising:

inputting, by a processor, information about a frequency distribution and a scale distribution;

performing, by the processor, either one or both of upside and downside discretizations for the input scale distribution;

calculating, by the processor, after performing division of all events, a probability value of a cumulative sum of losses for a portion out of all events in order to calculate either one or both of an upside sub-composite distribution and a downside sub-composite distribution, said upside sub-composite distribution being calculated based on the frequency distribution and the upside-discretized scale distribution, and said downside sub-composite distribution being calculated based on the frequency distribution and the downside-discretized scale distribution;

calculating, by the processor, upper and lower bounds of a loss distribution function based on either one or both of the upside and downside sub-composite distributions, calculates a function, as an approximate value of the loss distribution function, based on either one or both of the upside and downside sub-composite distributions, and calculates an accuracy of the approximate value; and outputting, by the processor, information about the approximate value of the loss distribution function with guaranteed accuracy, represented by information about the calculated accuracy;

the upside sub-composite distribution is the total sum of products of a first probability function and a first distribution function, with respect to a subset of instances of a probability variable indicating the number of loss events;

the first probability function is a probability function of a cumulative distribution function of the frequency distribution;

the first distribution function is a distribution function regarding the sum of plural discrete random variables dependent on the upside-discretized scale distribution; and the downside sub-composite distribution is the total sum of products of a second probability function and a second distribution function, with respect to a subset of instances of a probability variable indicating the number of loss events;

the second probability function is a probability function of a cumulative distribution function of the frequency distribution; and the second distribution function is a distribution function regarding the sum of plural discrete random variables dependent on the downside-discretized scale distribution.

6. The loss distribution calculation method according to claim 5, further comprising:

if the calculated accuracy has not reached a desired level, then enlarging, by the processor, a range of a portion where a probability value is calculated in the division of the all events and calculating, by the processor, again either one or both of the upside and downside sub-composite distributions, and when the calculated accuracy has reached a desired level, outputting by the processor, the information about the approximate value of the loss distribution function with guaranteed accuracy represented by information about the calculated accuracy.

7. A non-transitory computer-readable medium, on which a program is recorded, said program causes a computer to perform a loss distribution calculation method comprising:

inputting information about a frequency distribution and a scale distribution;

performing either one or both of upside and downside discretizations for the input scale distribution;

calculating, after performing division of all events, a probability value of a cumulative sum of losses for a portion out of all events in order to calculate either one or both of an upside sub-composite distribution and a downside sub-composite distribution, said upside sub-composite distribution being calculated based on the frequency distribution and the upside-discretized scale distribution, and said downside sub-composite distribution being calculated based on the frequency distribution and the downside-discretized scale distribution;

calculating upper and lower bounds of a loss distribution function based on either one or both of the upside and downside sub-composite distributions, calculates a function, as an approximate value of the loss distribution function, based on either one or both of the upside and downside sub-composite distributions, and calculates an accuracy of the approximate value; and outputting information about the approximate value of the loss distribution function with guaranteed accuracy represented by information about the calculated accuracy;

wherein:

the upside sub-composite distribution is the total sum of products of a first probability function and a first distribution function, with respect to a subset of instances of a probability variable indicating the number of loss events;

the first probability function is a probability function of a cumulative distribution function of the frequency distribution;

the first distribution function is a distribution function regarding the sum of plural discrete random variables dependent on the upside-discretized scale distribution; and the downside sub-composite distribution is the total sum of products of a second probability function and a second distribution function, with respect to a subset of instances of a probability variable indicating the number of loss events;

the second probability function is a probability function of a cumulative distribution function of the frequency distribution; and the second distribution function is a distribution function regarding the sum of plural discrete random variables dependent on the downside-discretized scale distribution.

8. The non-transitory computer-readable medium according to claim 7, wherein the method further comprises:

if the calculated accuracy has not reached a desired level, then enlarging a range of a portion where a probability value is calculated in the division of the all events and calculating again either one or both of the upside and downside sub-composite distributions, and when the calculated accuracy has reached a desired level, outputting the information about the approximate value of the loss distribution function with guaranteed accuracy represented by information about the calculated accuracy.

* * * * *

UNITED STATES PATENT AND TRADEMARK OFFICE
CERTIFICATE OF CORRECTION

PATENT NO. : 8,751,286 B2  
APPLICATION NO. : 13/497556  
DATED : June 10, 2014  
INVENTOR(S) : Morinaga Page 1 of 1

It is certified that error appears in the above-identified patent and that said Letters Patent is hereby corrected as shown below:

In the Specification:

Column 1, Line 39: Delete "NPL1," and insert -- NPL 1, --

Column 5, Line 3: Delete "pf(•)" and insert -- pf(•). --

Column 5, Line 19: Delete "3.238," and insert -- 3.2, --

Column 5, Line 38: Delete "P1:" and insert -- Pl: --

Column 5, Line 40: Delete "1_1" and insert -- l_1 --

Column 5, Line 40: Delete "1_n" and insert -- l_n --

Column 5, Line 43: Delete "1_i," and insert -- l_i, --

Column 5, Line 43: Delete "P1" and insert -- Pl --

Column 5, Line 65: Delete "Ds( )" and insert -- Ds(•), --

Column 8, Line 33 (Approx.): Delete ""ε"." and insert -- "ε'". --

Signed and Sealed this  
Twenty-first Day of October, 2014

Michelle K. Lee  
*Deputy Director of the United States Patent and Trademark Office*